United States Patent [19]

Johnson

[11] 3,911,650
[45] Oct. 14, 1975

[54] HAY LOADING APPARATUS
[76] Inventor: Donald F. Johnson, 238 N. Lake Drive, Watertown, S. Dak. 57201
[22] Filed: Jan. 2, 1974
[21] Appl. No.: 429,874

[52] U.S. Cl. .................... 56/13.3; 56/15.9; 56/344; 56/364
[51] Int. Cl.² ........................................ A01D 87/10
[58] Field of Search ........... 56/12.7, 13.3, 344, 345, 56/364, 15.9

[56] References Cited
UNITED STATES PATENTS
2,836,022 5/1958 Caldwell .............................. 56/13.3

FOREIGN PATENTS OR APPLICATIONS
1,053,875 1/1967 United Kingdom.................. 56/12.7
937,702 9/1963 United Kingdom.................. 56/12.7
1,194,192 6/1965 Germany ............................. 56/13.3
233,308 5/1964 Austria ................................ 56/12.7

*Primary Examiner*—J. N. Eskovitz
*Attorney, Agent, or Firm*—Dugger, Johnson & Westman

[57] ABSTRACT

Hay loading apparatus that includes a tractor having a front end, a hydraulic high lift assembly, a load assembly framework pivotally mounted on the front end of the high lift assembly and having forwardly extending arms, piston cylinders connected between the framework and the high lift assembly for selectively retaining said arms in a generally horizontal condition as the elevation of the framework is varied, a blower mounted on the framework between said arms, and a flail assembly mounted by said arms in front of the blower for discharging hay into the blower, the flail assembly having a housing that has a removable, front bottom plate and the blower having an outlet that has a top discharge opening, a closable side opening, and a movable baffle for selectively directing material through the top opening and the side opening.

8 Claims, 4 Drawing Figures

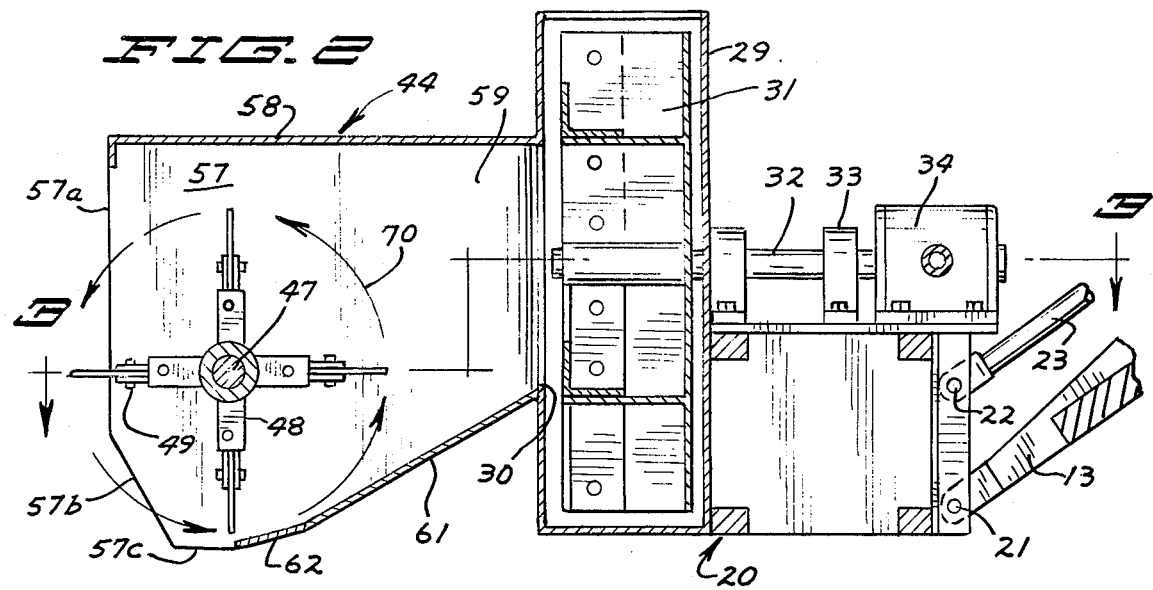
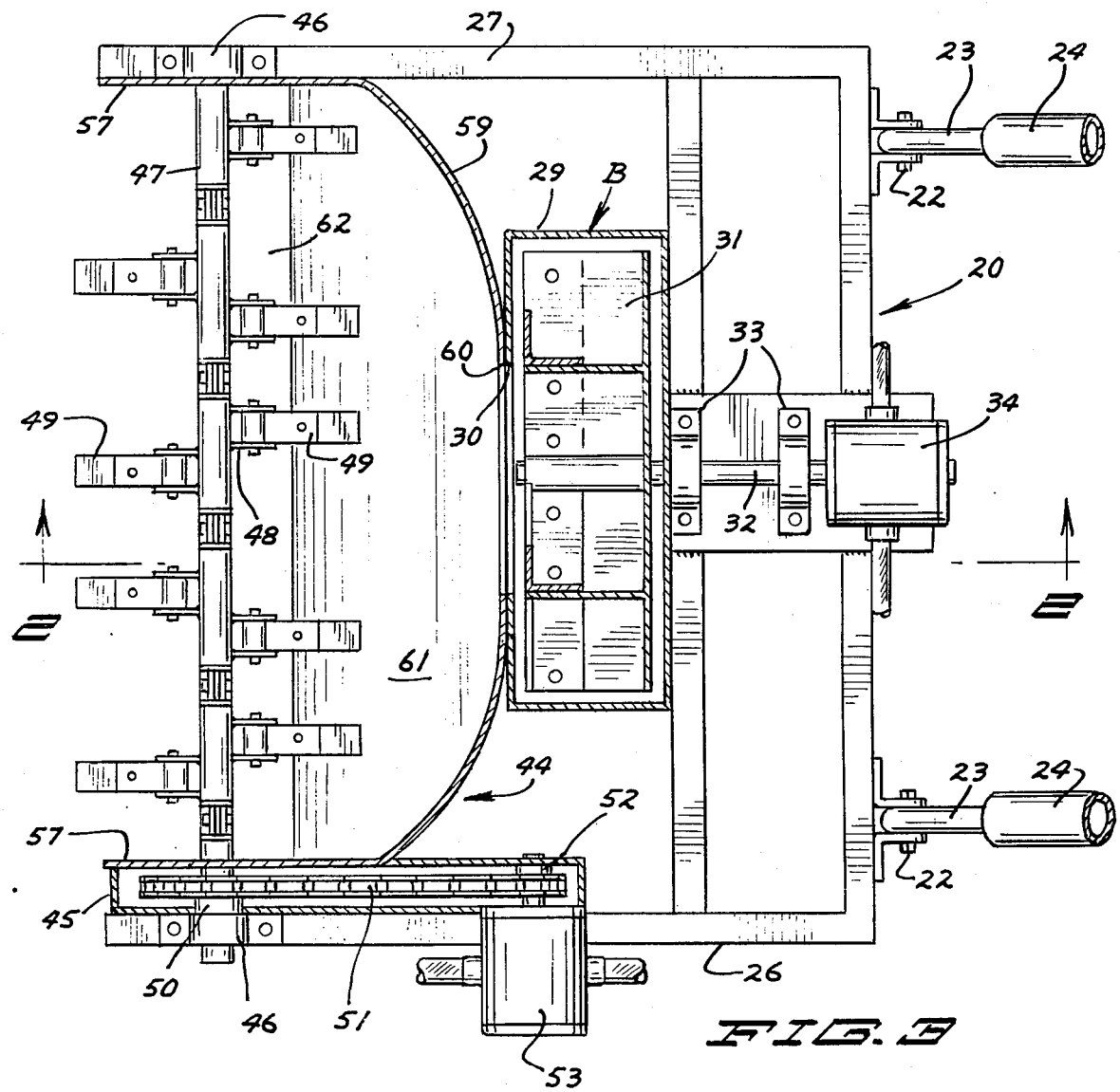

HAY LOADING APPARATUS

BACKGROUND OF THE INVENTION

Apparatus for loading crops such as hay that is mountable in the front end of a tractor high lift assembly.

Prior art apparatus that is mountable on the front end of a tractor has not been particularly suitable for loading stacked crops such as hay from a haystack. For example U.S. Pat. No. 2,836,022 to Caldwell discloses a flail housing that is mounted on the front portion of a pair of arms that are pivotally mounted on a tractor frame, but is not pivotable relative said arms. Further the path of movement of the flails does not extend forwardly of the flail housing. As a result the Caldwell structure is not suitable for loading hay from a stack. In order to provide apparatus suitable for loading hay from a stack as well as being usable for loading hay from windrows and pneumatically conveying the hay to a wagon or other structure in which the hay is to be loaded, this invention has been made.

SUMMARY OF THE INVENTION

Hay loader apparatus that includes a tractor having a high lift assembly and a loader assembly mounted on the lift assembly for movement therewith and relative thereto, the loader assembly including a blower, a flail housing opening to the blower and a rotary flail in the housing to cooperate therewith for loading hay from a stack or from windrows.

One of the objects of this invention is to provide a new and novel hay loader having a rotary flail for loading hay from a stack. In furtherance of the above object, it is another object of this invention to mount a rotary flail assembly in a flail housing that has a path of movement extending forwardly of the housing.

BRIEF DESCRIPTION OF THE DRAWINGS

FIG. 2 is a longitudinal, vertical cross sectional view of the hay loader assembly, said view being generally taken along the line and in the direction of the arrows 2—2 of FIG. 3;

FIG. 3 is a horizontal cross sectional view of the hay loader assembly that is generally taken along the line and in the direction of the arrows 3—3 of FIG. 2.

Figure 1:
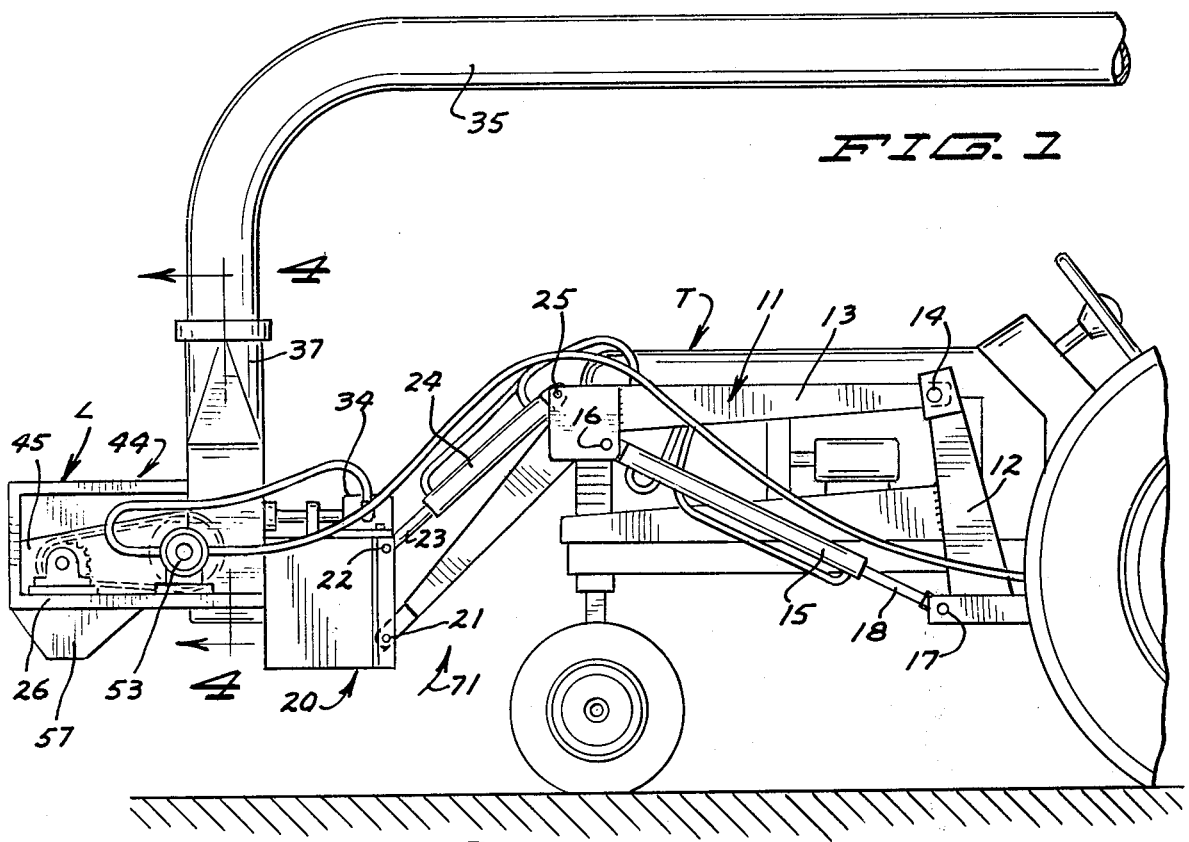
FIG. 1 is a side view of the hay loading apparatus of this invention with the hay loader assembly shown in a generally horizontal extending position at an intermediate elevation.
Figure 4:
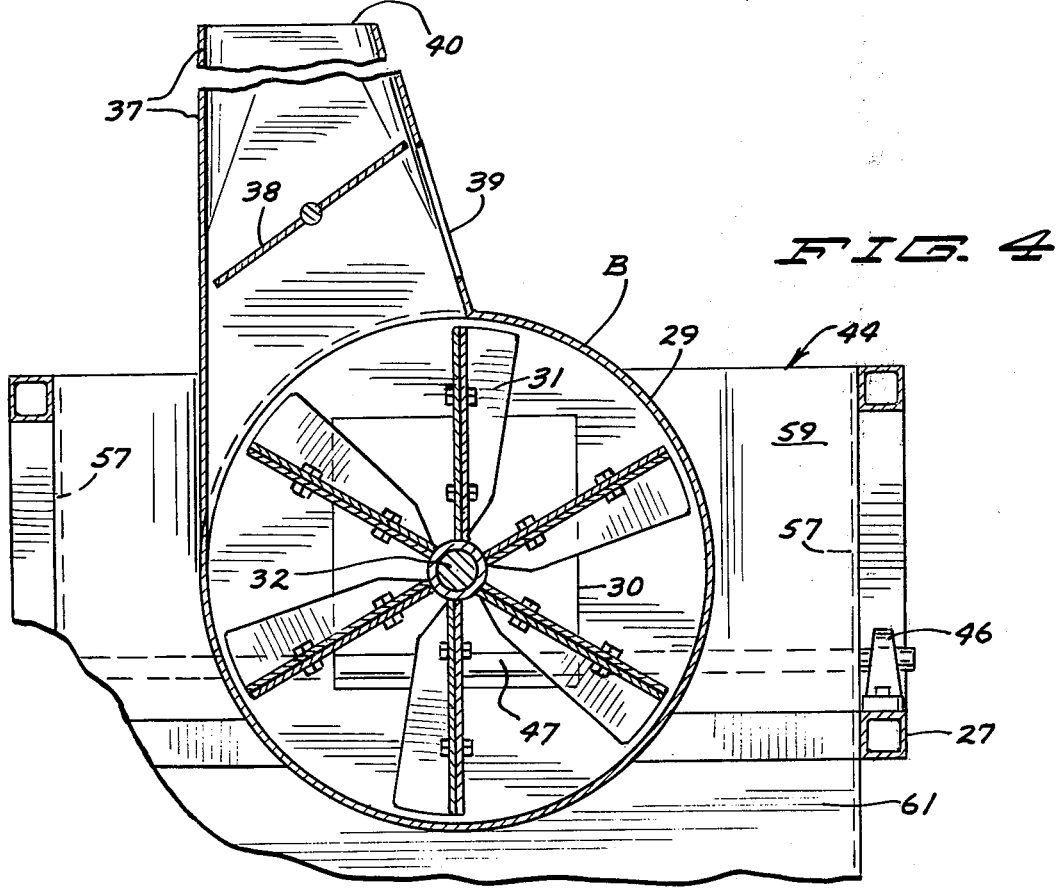
FIG. 4 is a fragmentary view, part in cross section, generally taken along the line and in the direction of the arrows 4—4 of FIG. 1 to illustrate the flail housing, and the blower having a baffle whereby materials can be ejected out of a side opening in the fan housing outlet or alternately through the top terminal end of the housing outlet.

Referring now to the drawings there is shown a tractor, generally designated T, that has a high lift assembly, generally designated 11, mounted on the tractor frame to extend forward thereof. The tractor frame on each side thereof includes a frame member 12 that has one end of an angular arm 13 pivotally connected thereto at 14 and a piston rod 18 pivotally connected thereto at 17. The pivot 17 is at a substantially lower elevation than the pivot 14, the piston rod 18 being part of the piston cylinder combination 15,18. The cylinder is pivotally connected at 16 to the central apex portion of the angular arm 13. The opposite, front, end of the angular arm is pivotally connected to the transversely extending framework, generally designated 20, of the loader assembly generally designated L. One end of the piston rod 23 of the piston cylinder combination 23,24 is pivotally connected to the framework 20 at a higher elevation than pivot 21 by a pivot member 22. The cylinder 24 is pivotally connected at 25 to the intermediate portion of the angular arm forwardly and at a higher elevation than the pivot member 16. Appropriate controls (not shown) are provided for applying fluid under pressure to the two way acting cylinders 15,24.

Mounted on framework 20 is a pair of parallel, forwardly extending arms 26,27; the framework mounting a blower, generally designated B, to be located between the arms 26,27. The blower B includes blower housing 29 having a forwardly opening blower inlet 30 and a fan 31 that is keyed to the longitudinally extending fan shaft 32 to rotate therewith. The fan shaft is rotatably mounted by mounts 33 which are in turn mounted on the framework 20, the fan shaft being driven by a hydraulic motor 34 that is also mounted on the framework 20. The fan housing includes an outlet 37 that has a top terminal discharge opening 40, a side wall of the outlet having a closable discharge opening 39. Advantageously, the baffle 38 may be mounted in the outlet for directing material outwardly to the opening 39 when there is no closure thereover, or alternately through the upper terminal opening 40 of the outlet to be discharged into a duct 35 that has one end mounted on the upper edge portion of the outlet. Advantageously the duct 35 may be of a length to extend rearwardly of the tractor for discharging hay or other material into the wagon that is being pulled by the tractor, supporting structure (not shown) being provided for supporting the duct.

The flail housing, generally designated 44, extends between the arms 26,27 and forwardly of the blower. The drive housing 45 is attached to the arm 26 and the side wall 57 of the flail housing for securing the flail housing to the arm 26. The drive housing has an openable closure (not shown). The transverse, horizontal flail shaft 47 has its opposite end portions rotatably mounted by mounts 46 which in turn are mounted on the arms 26,27 respectively. A plurality of horizontally spaced flails 49 are mounted to pivot about transverse axes parallel to shaft 47 by brackets 48 which in turn are welded to the flail shaft to rotate therewith. The flails are mounted to be angularly spaced and axially spaced with reference to one another. In order to drive the flail shaft, the sprocket 50 is keyed to the flail shaft to be located in the drive housing 45; a chain 51 being extended around sprocket 50 and around a sprocket 52 that is keyed to the motor shaft of the hydraulic motor 53. Hydraulic motor 53 is mounted on the arm 26.

The flail housing 44 includes a pair of vertical side wall 57, a horizontal top wall 58 extending between side walls and secured thereto, and a vertical rear wall 59 that is arcuately curved and converges in a rearward direction toward the transverse central part thereof. The rear wall is provided with a discharge opening 60 that opens directly to the fan housing inlet 30. The flail housing also includes a bottom wall 61 that extends between the side walls and is inclined upwardly in a rearward direction at a substantial angle. The rear edge of the bottom wall is joined to the bottom edge of the rear wall. The forward transverse edge of the bottom wall is located horizontally rearwardly of the flail shaft 47 and forwardly of the rearward most part of the path of travel of the flails, and at an elevation that is about the same or slightly above the lowermost portion of the path of travel of the flails when they are being drivenly rotated by the flail shaft. A plate 62 is removably secured by conventional means (not shown) to the housing side walls and/or bottom wall 61, and has a rear transverse edge closely adjacent the forward terminal edge of the bottom plate and a front edge that is located nearly directly vertically beneath the axis of rotation of the shaft 47 and at a slightly lower elevation than the lowermost part of path of travel of the flails when they are being driven.

As may be noted from FIG. 2, the side walls 57 have front terminal vertical edges 57A that are located a short distance rearwardly of the forward-most part of the path of travel of the flails when they are being drivenly rotated, the edges 57A extending downwardly to an elevation a short distance below the elevation of the axis of rotation of the flail shaft. Further the side walls have front terminal downwardly and rearwardly inclined edges 57B that are joined to the lower part of edges 57A to terminate at terminal bottom horizontal edges 57C which are located at substantially the same elevation as the front terminal edge of plate 62 when it is mounted on the housing, the intersection of radial lines through the shaft axis with the juncture of edges 57A, 57B being substantially rearwardly of the forward-most part of the path of movement of the flails. Edges 57A, 57B and the housing top wall front edge in part define the front inlet of the housing. As shown in FIG. 2, the housing top wall front edge is at a higher elevation than the axis of rotation of the flail shaft and a substantial distance rearwardly of the forward-most part of the path of movement of the flails and forwardly of the flail shaft axis.

When using the apparatus of this invention, for loading crops, for example hay that has been windrowed, the piston cylinder combinations 15,18 are operated to lower the framework 20 from the position shown in FIG. 1 to a position closely adjacent the ground and the piston cylinder combinations 23,24 operated to pivot the framework about pivots 21 in the direction opposite arrow 71 so that the arms 26,27 extend generally parallel to the ground when the lowermost part of the flail housing side walls are spaced slightly above the ground. Now with the blower motor and the flail drive motors operating, the tractor is moved forwardly. As the flail shaft is rotated, the flails 49 assume generally the position illustrated in FIG. 2 as they rotate in the direction of the arrows 70 to move the hay inwardly over plate 62, through the housing outlet 60 and into the blower inlet 30. As the hay is moved inwardly into the housing, a certain amount of chopping of the hay takes place. The blower also operates to draw hay through the housing and discharges the hay through the blower outlet 40 and through the duct 35 into a wagon or trailer as it is being pulled by the tractor.

In the event the apparatus of this invention is to be used for loading hay from a stack, fluid under pressure is applied to the cylinders 15 to move the piston rods 18 to their extended position and thereby elevate the framework 20 to a higher elevation which may be a substantial distance above the tractor. Further, fluid under pressure is applied to the appropriate ends of the cylinders 24 for extending the piston rods 23 to pivot the framework in the direction of arrow 71 to position arms 26,27 to be generally parallel to the ground. Now, with the plate 62 removed, the tractor is moved forwardly so that the forward edge of the bottom plate 61 is adjacent the edge of the stack and the flails are at a higher elevation than the top of the stack. Then fluid under pressure is applied to cylinders 15 for retracting their piston rods to move the framework downwardly, and to the cylinders 24 for retaining the arms 26,27 generally horizontally. As a result the flails 49 chop hay away from the stack and move the hay into the flail housing. The ability of the apparatus of this invention to load hay from the stack is substantially enhanced due to the flails 49 in a generally radially forwardly extending position from the shaft extend forwardly of the flail housing including edges 57A. Due to the pivotal mounting of the flails, in the event the flails should hit a hard substance that is not broken or chopped to pieces, the flails can pivot backwardly to prevent damage to the coil.

It should be mentioned, that when the apparatus is used in the manner described in either of the two preceding paragraphs, the blower outlet opening 39 is closed by suitable closure and the baffle 38 extends generally parallel to the side wall opening or else it is removed. However, if the apparatus of this invention is to be used as a snowblower, then the baffle 38 is used in the position illustrated 34, the openings 39 uncovered, and the plate 62 is removed from the housing. As a result, discharge from the blower through the opening 39 is directed transversely outwardly of the machine.

As an example of one model of the invention but not otherwise as a limitation on the invention, the maximum vertical height of each of the side walls 57 may be about two feet, six inches, the horizontal transverse distance between the side walls about five feet, the maximum diameter of the path of movement of the flails (from the remote diametrically opposed edges of flails as illustrated in FIG. 2), is a dimension of about two feet, and the outer periphery of the path of movement of the flails extend about two and one quarter inch horizontally forwardly of the front edges of 57A and the fan is of a diameter about three feet.

What is claimed is:

1. Loader apparatus comprising a tractor having a high lift assembly that includes a pair of lift arms having longitudinally extending front end portions and rear end portions, means for mounting the rear end portions on the tractor for pivotal movement about a transverse axis, and power means for moving the high lift assembly about the above mentioned axis between a first position that the front end portions are in a lowered position and a second position that the front end portions are at a higher elevation than the tractor and said lowered position, a loader assembly and means for mounting the loader assembly on said front end portions, the last mentioned means including means for mounting the loader assembly on the front end portions for pivotal movement about a transverse axis relative the front end portions, and power means connected to the loader assembly for selectively pivoting the loader assembly about the last mentioned axis, said loader assembly including a framework, a flail housing mounted on said framework and having a front inlet opening, and a rear discharge opening, a blower mounted on the housing for receiving material to be loaded from the housing discharge opening and imparting a propelling force to the material to convey the material to a loading position, and a power driven rotary flail assembly mounted on the housing for moving material from adjacent the front opening into the housing toward the discharge opening, said flail assembly including a transverse shaft mounted to extend within housing for rotation about a transverse axis and flails mounted on the shaft.

2. The apparatus of claim 1 further characterized in that the housing has a top wall and transversely spaced side walls that in part define said front inlet opening, said side walls having generally vertical front edges a substantial distance rearwardly of the forwardmost part of the path of movement of the flails and forwardly of said axis, that the first mentioned means comprising pivot members for pivotally mounting the the rear portions on the tractor, the first mentioned power means being mounted on the tractor and connected to the lift assembly arms for moving the lift assembly arms between the front end portion lowered position and a second position, the arms front end portions are at a higher elevation than the tractor, that the framework includes a pair of arms having one end portions, that the means for mounting the loader assembly on the front end portions comprises pivot members pivotally connecting said one end portions to the front end portions, and that the second mentioned power means is pivotally connected to the loader assembly and the lift assembly arms and operable for retaining the loader assembly arms generally parallel to the ground in both the lift assembly arms lowered and elevated positions.

3. Loader apparatus comprising a tractor having a high lift assembly that includes a pair of lift arms having longitudinally extending front end portions and rear end portions, means for mounting the rear end portions on the tractor for pivotal movement about a transverse axis, and power means for moving the high lift assembly about the above mentioned axis between a first position that the front end portions are in a lowered position and a second position that the front end portions are at a higher elevation than the tractor and said lowered position, a loader assembly and means for mounting the loader assembly on said front end portions, the last mentioned means including means for mounting the loader assembly on the front end portions of pivotal movement about a transverse axis relative the front end portions, and power means connected to the loader assembly for selectively pivoting the loader assembly about the last mentioned axis, said loader assembly including a framework, a flail housing mounted on said framework and having a front inlet opening, and a rear discharge opening, a blower mounted on the housing for receiving material to be loaded from the housing discharge opening and imparting a propelling force to the material to convey the material to a loading position, and a power driven rotary flail assembly mounted on the housing for moving material from adjacent the front opening into the housing toward the discharge opening, said flail assembly including a transverse shaft mounted for rotation about a transverse axis and flails mounted on the shaft, the housing having a top wall, transversely spaced side walls that in part define said front inlet opening, said side walls having generally vertical front edges a substantial distance rearwardly of the forward-most part of the path of movement of the flails and forwardly of the shaft axis, and a bottom wall that has a front transverse terminal edge that is at a lower elevation than the shaft axis, rearwardly of said shaft axis and a substantial distance forwardly of the rearward-most part of the path of movement of the flails, said top wall having a front edge that is at a higher elevation than said shaft axis and a substantial distance rearwardly of the forward-most part of the path of movement of the flails and forwardly of said shaft axis.

4. The apparatus of claim 3 further characterized in that the side walls have bottom edges extending forwardly of said shaft axis and downwardly to a lower elevation than the path of movement of the flails, and a removable plate mounted on the housing to extend between the bottom edges, rearwardly to the bottom plate and forwardly to a position adjacent the lowermost part of the path of movement of the flails.

5. For being mounted on a high lift assembly of a tractor to be supportingly carried thereby, loader apparatus comprising a framework having a front end portion and a rear end portion longitudinally rearwardly of the front end portion, a flail housing mounted on the framework and having a front inlet opening and a rear discharge opening longitudinally rearwardly of the front opening, a blower mounted on the framework and having an inlet opening directly to the housing discharge opening to receive material from the housing, a flail shaft mounted in the housing for rotation about a transverse axis, a plurality of flails, and means for mounting the flails in angular and transverse spaced relationship on the shaft to rotate therewith, said housing having a top wall that has a front edge that is at a higher elevation than said axis and a substantial distance rearwardly of the forward-most part of the path of movement of the flails and forwardly of said axis, vertical side walls that in part define said front opening, said side walls having generally vertical front terminal edges located a substantial distance rearwardly of the forwardmost part of the path of movement of the flails as the shaft is rotating, and a bottom wall extending between the side walls, said bottom wall having a front terminal transverse edge longitudinally between the forward-most and rearward-most part of the path of movement of flails when the shaft is rotating and and at a lower elevation than said axis.

6. The apparatus of claim 4 further characterized in that there is provided on the rear portion of the framework, means adapted for mounting the framework on the high lift assembly for pivotal movement about a transverse axis, and a piston cylinder combination having a piston rod and cylinder, one of the piston rod and cylinder being connected to the framework at a higher elevation than the last mentioned transverse axis for pivotal movement about a transverse axis and the other being adapted for being pivotally connected to the high lift assembly.

7. The apparatus of claim 6 further characterized in that a first hydraulic motor is mounted on the framework and drivingly connected to the blower, that a second hydraulic motor is mounted on the framework and is drivingly connected to said shaft, and that the bottom wall front edge is located rearwardly of the shaft axis and that a bottom plate is removably mounted on the housing to extend between the side walls and adjacent the bottom wall, said bottom plate having a front transverse edge located substantially directly vertically beneath the lowermost part of the path of movement of the flails, when rotating, and closely adjacent thereto.

8. Loader apparatus comprising a tractor having a high lift assembly that includes longitudinally extending front end portions, and means for moving the high lift assembly between a first position that the front end portions are in a lowered position and a second position at a substantially higher elevation than said lowered position, a loader assembly and means for mounting the loader assembly on said front end portions, the last mentioned means including means for mounting the loader assembly on the front end portions for pivotal movement about a transverse axis relative the front end portions, and power means connected to the loader assembly for selectively pivoting the loader assembly about the above mentioned axis, said loader assembly including a framework, a flail housing mounted on said framework and having a front inlet opening, and a rear discharge opening, a blower mounted on the housing for receiving material to be loaded from the housing discharge opening and imparting a propelling force to the material to convey the material to a loading position, and a power driven rotary flail assembly mounted on the housing for moving material from adjacent the front opening into the housing toward the discharge opening, the flail assembly including a transverse shaft mounted for rotation about a transverse axis and flails mounted on the shaft, the housing has a top wall, transversely spaced side walls that in part define said front inlet opening, said side walls having generally vertical front edges a substantial distance rearwardly of the forward-most part of the path of movement of the flails and forwardly of said shaft axis, and a bottom wall that has a front transverse terminal edge that is at a lower elevation than the shaft axis and rearwardly of said shaft axis, said top wall having a front edge that is at a higher elevation than said shaft axis and a substantial distance rearwardly of the forward-most part of the path of movement of the flails and forwardly of said shaft axis.

* * * * *